United States Patent [19]

Hattori et al.

[11] Patent Number: 4,665,407

[45] Date of Patent: May 12, 1987

[54] THERMAL PRINTER

[75] Inventors: Shigenori Hattori, Oharucho; Hideo Ueno, Nagoya; Toyohisa Uchida, Yokkaichi; Naohisa Kinoshita, Nagoya, all of Japan

[73] Assignee: Brother Industries, Ltd., Nagoya, Japan

[21] Appl. No.: 858,559

[22] Filed: Apr. 24, 1986

Related U.S. Application Data

[63] Continuation of Ser. No. 673,571, Nov. 21, 1984, abandoned.

[30] Foreign Application Priority Data

Nov. 25, 1983 [JP] Japan .......................... 58-182390[U]

[51] Int. Cl.[4] .............................................. G01D 15/10

[52] U.S. Cl. ............................... 346/76 PH; 346/105; 400/356

[58] Field of Search ................ 346/76 R, 76 PH, 105, 346/134 R; 400/120, 356, 223; 214/216 PH; 250/318

[56] References Cited

U.S. PATENT DOCUMENTS 4,387,380 6/1983 Asakura et al. ................ 346/76 PH

*Primary Examiner*—Arthur G. Evans

*Attorney, Agent, or Firm*—Kane, Dalsimer, Kane, Sullivan and Kurucz

[57] ABSTRACT

A thermal printer using a thermal transfer-printing ribbon including a thermal head movable between an operative position in which it is held in pressing engagement with a printing sheet and an inoperative position in which it is released from pressing engagement with the printing sheet. After lapse of a predetermined time following completion of a printing operation or interruption thereof, the thermal head is automatically moved from the operative position in which it has performed a printing operation to the inoperative position in which it is away from the printing sheet and performs no printing operation.

4 Claims, 6 Drawing Figures

THERMAL PRINTER

RELATED APPLICATION

This is a continuation of application Ser. No. 673,571, filed Nov. 21, 1984, now abandoned.

BACKGROUND OF THE INVENTION (1) Field of the Invention

This invention relates to a thermal printer using a thermal transfer-printing ribbon.

(2) Description of the Prior Art

Generally, in a thermal printer using a thermal transfer-printing ribbon, a thermal head is moved along a line of printed characters while pressing against a printing sheet through a thermal transfer-printing ribbon, and a multiplicity of heat generating elements located in the thermal head are selectively actuated to generate heat which melts a coat of thermo-melt ink applied to the thermal transfer-printing ribbon to print characters on the printing sheet by thermal transfer-printing. However, when the printing operation is finished or the printing operation is interrupted, the thermal head is still held in pressing engagement with the printing sheet. Thus, when an attempt is made to set or remove the printing sheet or to replace the old thermal transfer-printing ribbon by a new one, it is necessary to manually actuate a head released lever to move the thermal head away from the printing sheet. This is result in the printer being low in operability.

SUMMARY OF THE INVENTION

This invention has been developed for the purpose of obviating the aforesaid disadvantage of the prior art. Accordingly, the invention has as its object the provision of a thermal printer of high operability capable of automatically moving the thermal head away from the printing sheet when the printing operation is finished or the printing operation is interrupted, by a simple construction.

According to the invention, there is provided a thermal printer comprising first holding means for normally holding a thermal head having a multiplicity of heat generating elements in an inoperative position in which the thermal head is away from a printing sheet, and second holding means for holding the thermal head in an operative position when data are printed in which the thermal head presses against the printing sheet through a thermal transfer-printing ribbon and the heat generating elements are selectively caused to produce heat to melt a coat of thermo-melt ink applied to the thermal transfer-printing ribbon to print predetermined characters on the printing sheet by transfer-printing, wherein the improvement comprises actuating means for moving the thermal head between the inoperative position in which the thermal head is released from pressing engagement with the printing sheet and the operative position in which the thermal head is held in pressing engagement with the printing sheet, counter means set for operation when printing data are inputted and commences a counting operation after the data are printed, and a control unit for causing the actuating means to move the thermal head from the operative position to the inoperative position when the content of the counter reaches a predetermined value.

Additional and other objects, features and advantages of the invention will become apparent from the description set forth hereinafter when considered in conjunction with the accompanying drawings.

DESCRIPTION OF THE PREFERRED EMBODIMENT

A preferred embodiment of the invention will now be described by referring to the accompanying drawings.

Figure 1:
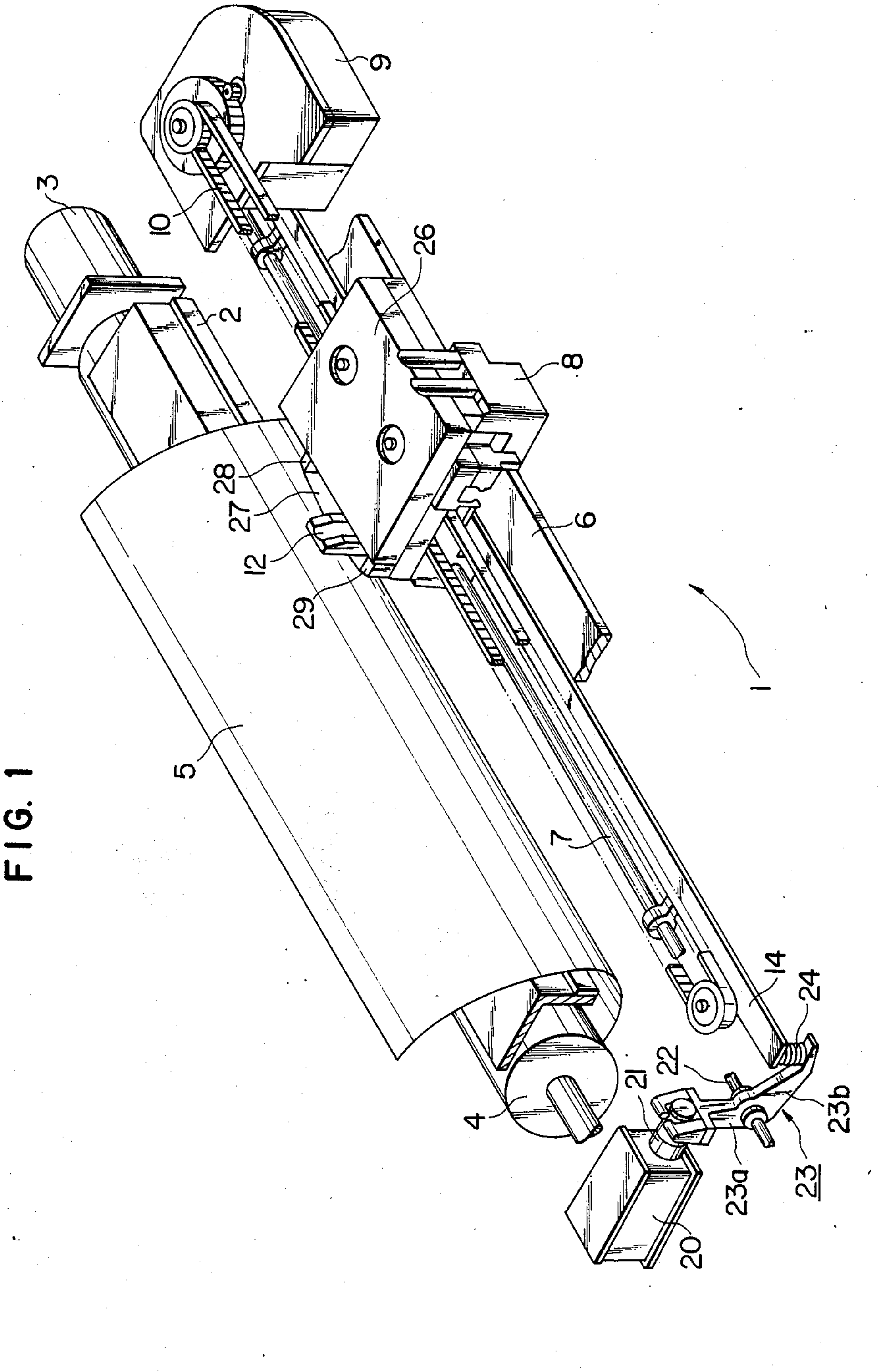
FIG. 1 is a fragmentary perspective view of a thermal printer in which the invention is incorporated.
Figure 2A:
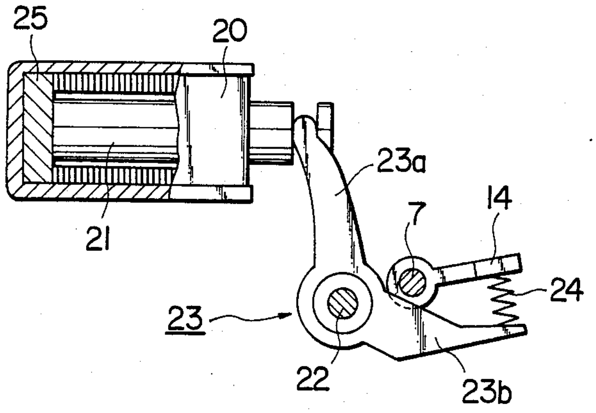
FIG. 2(A) is a view, with certain parts being broken away, in explanation of the actuating means disposed in a position in which it has moved the thermal head to the operative position in which it presses against a printing sheet.
Figure 2B:
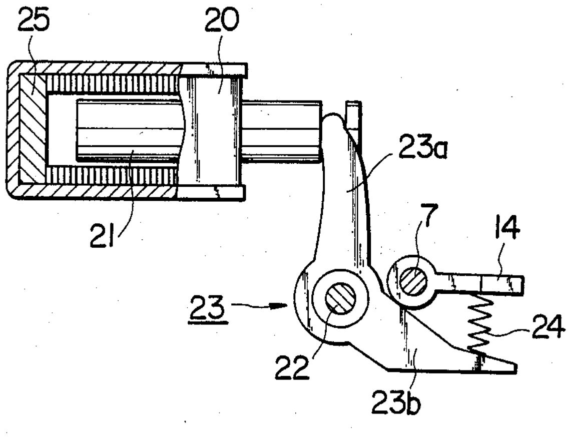
FIG. 2(B) is a view, with certain parts being broken away, in explanation of the actuating means disposed in a position in which it has moved the thermal head to the inoperative position in which it is released from pressing engagement with the printing sheet.
Figure 3:
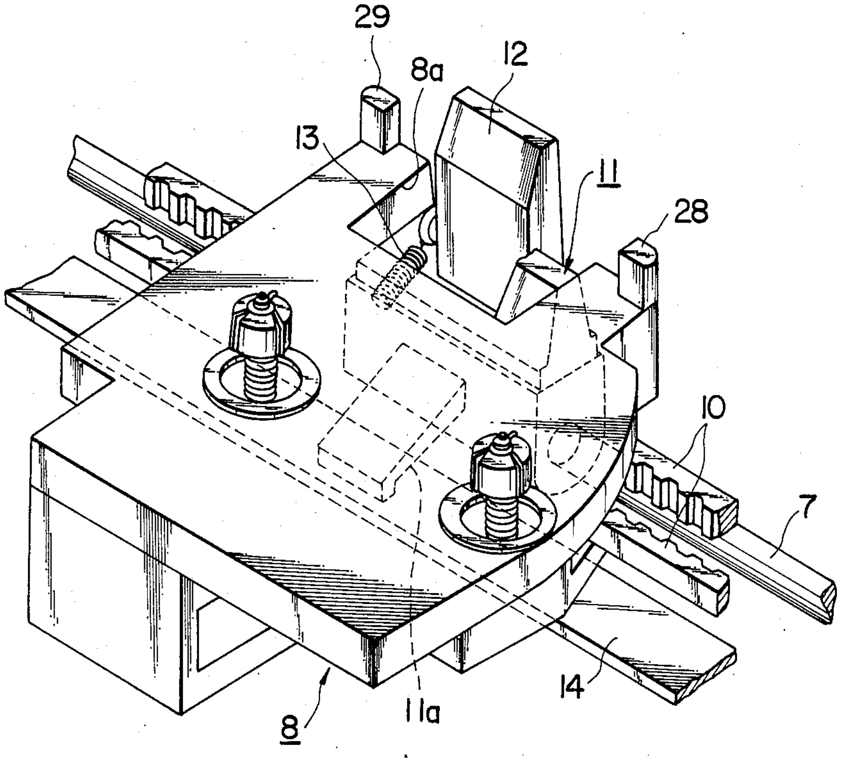
FIG. 3 is a fragmentary perspective view of the carriage.

In FIGS. 1-3, a thermal printer generally designated by the reference numeral 1 includes a platen 2 secured to a frame, not shown, which supports a printing sheet 5 mounted thereon, and a support drum 4 is rotated by a sheet advancing step-motor 3 drivingly connected thereto. Also secured to the frame are a carriage guide 6 and a guide shaft 7 located parallel to the platen 2. The carriage guide 6 supports a carriage 8 which is driven for reciprocatory movement by a drive belt 10 connected to a step-motor 9 as the step-motor 9 rotates. The guide shaft 7 supports a head holder 11 for pivotal movement which is also movable in reciprocatory movement. The head holder 11 which is located in a cutout 8*a* formed in the carriage 8 is movable with the carriage 8 as a unit. The head holder 11 has mounted thereon a thermal head 12 which is provided with a multiplicity of heat generating elements, not shown, arranged in the direction of movement of the printing sheet 5, which are selectively caused to generate heat to print characters in a dot matrix.

Referring to FIG. 3, a tension spring 13 serving as first holding means is mounted between the carriage 8 and head holder 11 to hold by its biasing force the thermal head 12 in an inoperative position in which it is released from pressing engagement with the printing sheet 5. Pivotably supported by the guide shaft 7 is a head release plate 14 which is brought into pressing engagement with a lever 11*a* of the head holder pivotally moved by the biasing force of the tension spring 13 and is held in a position shown in FIG. 2(B), to thereby move the thermal head 12 away from the printing sheet 5. A solenoid 20 serving as actuating means is mounted on the frame on a left end of the head release plate 14 as shown in FIG. 1. The solenoid 20 which is of a bifilar winding type is operative to move a plunger 21 to a position shown in FIG. 2(A) or a position shown in FIG. 2(B) by suitably switching a current from one winding to the other. The plunger 21 has connected thereto one arm 23*a* of a pivotable lever 23 movable in pivotal movement about a support shaft 22 and having another arm 23b which is connected to the head release plate 14 through a compression spring 24. A permanent magnet 25 serving as second holding means is mounted within the solenoid 20 and operative to magnetically attract the plunger 21 moved to the position shown in FIG. 2(A), to keep the pivotable lever 23 in the illustrated position. This brings the lever 11a into pressing engagement with the head release plate 14, to thereby keep the thermal head 12 in an operative position in which it presses against the printing sheet 5. Replaceably mounted on the carriage 8 is a ribbon cassette 26 having mounted therein a roll of thermal transfer-printing ribbon 27 having a coat of thermomelt ink applied thereto. The thermal transfer-printing ribbon 27 is guided by guide pins 28 and 29 attached to the carriage 8 so as to be located in front of the thermal head 12. A ribbon drive motor, not shown, is mounted on the carriage 8 and driven for rotation as a printing operation is performed, to feed or advance the thermal transfer-printing ribbon 27.

Figure 4:
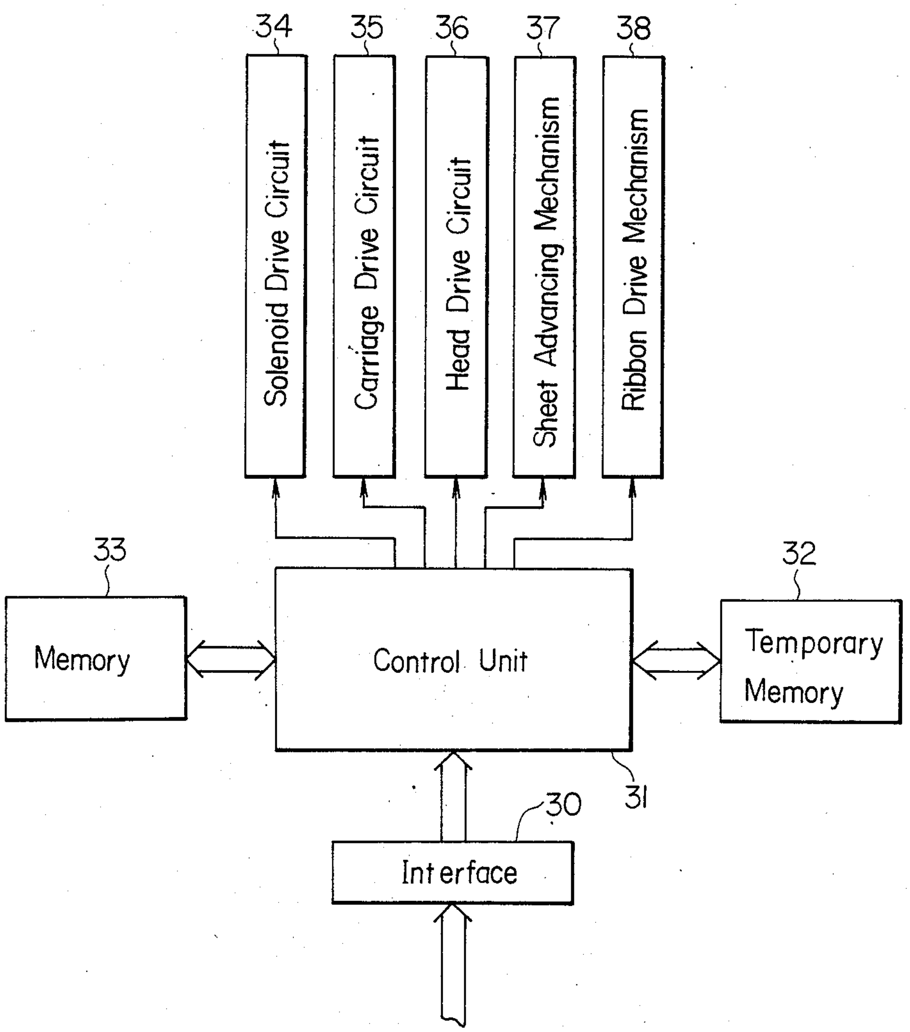
FIG. 4 is an electronic block diagram of the thermal printer.

Referring to FIG. 4, as printing data are inputted from a data input device, not shown, such as a keyboard, via an interface 30, a control unit 31 writes the printing data to a temporary memory 32 that can be rewritten. As a unit of printing data corresponding to one line of printed characters is written to the temporary memory 32, access is had from the temporary memory 32 to the control unit 31 which reads out from a memory 33 a unit of pattern data based on the unit of printing data for printing one line of characters. The memory 33 stores a multiplicity of units of pattern data of each character corresponding to units of printing data.

The control unit 31 outputs a head pressing signal of a predetermined duration to a solenoid drive circuit 34, to energize one winding of the solenoid 20. This moves the plunger 21 to the position shown in FIG. 2(A) and causes the pivotable lever 23 to move in pivotal movement, so that the plunger 21 is magnetically attracted to the permanent magnet 25. Thus, the head release plate 14 is held in the position shown in FIG. 2(A) in which it presses against the lever 11a to force the thermal head 12 against the printing sheet 5.

After the thermal head 12 is brought into pressing engagement with the printing sheet 5 as described hereinabove, the control unit 31 outputs a carriage drive signal to a carriage drive circuit 35 to drive the carriage drive step-motor 9 (FIG. 1) for rotation. Rotation of the step-motor 9 causes the carriage 8 to move along a line in which characters are to be printed on the printing sheet 5, as shown in FIG. 1. As the carriage 8 moves, the control unit 31 outputs a printing signal corresponding to the particular pattern data to a head drive circuit 36, to selectively cause the heat generating elements to produce heat. The heat generated by the heat generating elements melts the coat of thermo-melt ink on the thermal transfer-printing ribbon 27 and the ink is transferred from the ribbon to the printing sheet 5 to print characters thereon. As the printing operation is performed, the control unit 31 outputs a ribbon advancing signal to a ribbon drive mechanism 38, to drive the ribbon drive motor for rotation.

After one line of characters has been printed by the above-mentioned operation, the control unit 31 outputs a head release signal of a predetermined duration to the solenoid drive circuit 34 as a sheet advancing signal or a back space signal is inputted to the control unit 31, to energize the other winding of the solenoid 20. The magnetic force of the solenoid 20 cancels out the magnetic force of the permanent magnet 25, so that the plunger 21 is moved to the position shown in FIG. 2(B). Thus, the head release plate 14 is moved to and held in the position shown in FIG. 2(B) by the biasing force of the tension spring 13 acting thereon via the lever 11a, and the thermal head 12 is brought out of pressing engagement with the printing sheet 5, whereby the thermal head 12 is held in the inoperative position in which it is away from the printing sheet 5.

Following the movement of the thermal head 12 to the inoperative position, the control unit 31 outputs a sheet advancing signal to a sheet advancing mechanism 37 which actuates the sheet advancing step-motor 3 to bring a portion of the printing sheet 5 on which a next line of characters is to be printed into face-to-face relation with the thermal head 12 or to supply a drive signal to the carriage drive step-motor 9 to cause the carriage 8 to perform a back space operation.

After lapse of a predetermined time following completion of the printing operation or interruption thereof, the control unit 31 outputs a solenoid release signal to the solenoid drive circuit 34, to release the plunger 21 from the influence of the permanent magnet 25 as shown in FIG. 2(B). The movement of the plunger 21 to the position shown in FIG. 2(B) allows the pivotable lever 23 to move in pivotal movement, so as to be held in place by the biasing force of the tension spring 13. Thus, the thermal head 12 is held in the inoperative position in which it is away from the printing sheet 5.

Figure 5:
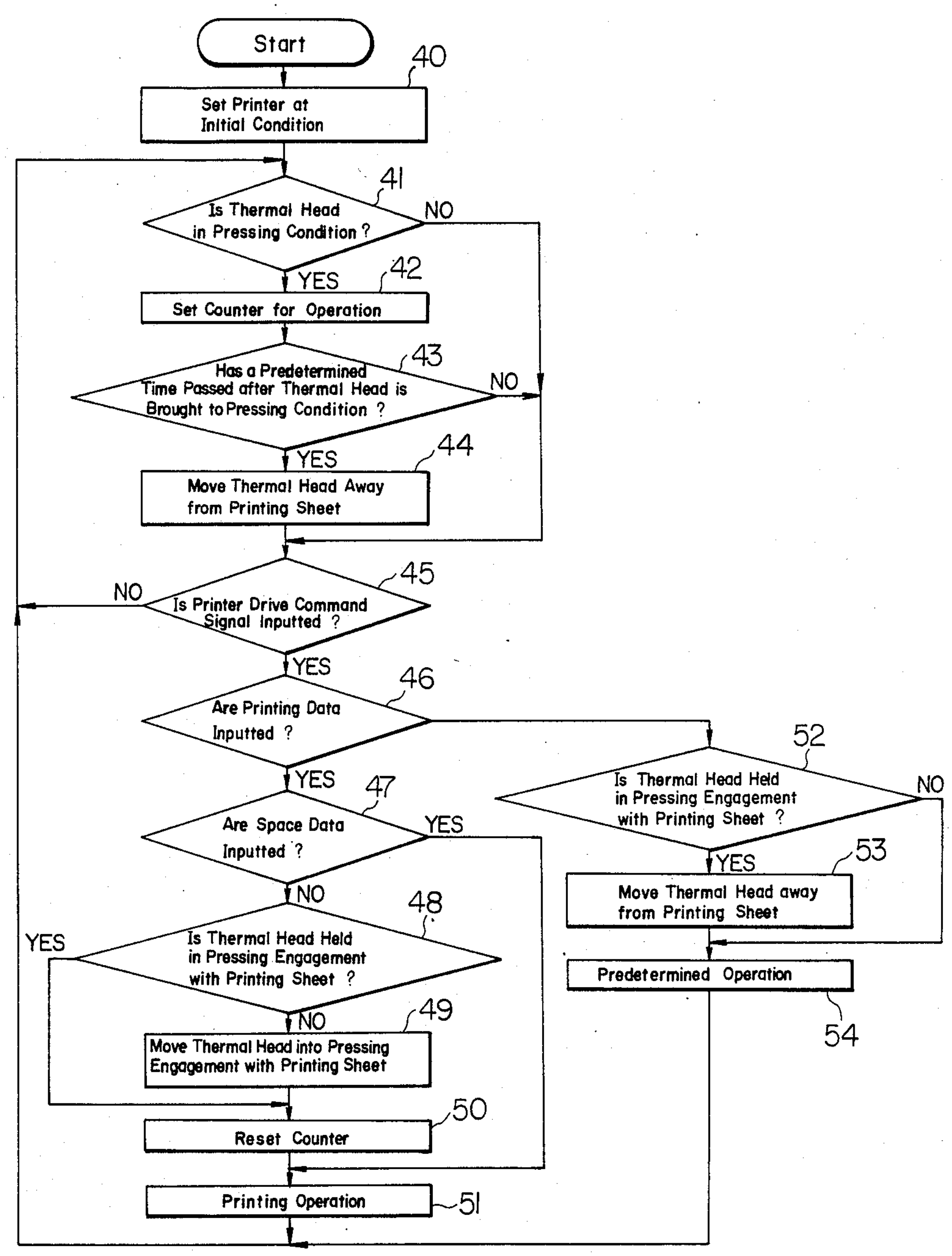
FIG. 5 is a flow chart of the operation for releasing the thermal head from pressing engagement with the printing sheet after a printing operation is finished or interrupted.

The operation of moving the thermal head 12 to the inoperative position in which it is released from pressing engagement with the printing sheet 5 following the completion of the printing operation or the interruption thereof will be described by referring to FIG. 5.

In step 40, the control unit 31 sets the printer 1 at initial operation condition. In step 41, it is judged whether or not the thermal head 12 is held in pressing engagement with the printing sheet 5. If the judgment is YES, the control unit 31 is set, in step 42, for operation for counting the time during which the thermal head 12 is maintained in pressing engagement with the printing sheet 5. Then, in step 43, it is judged whether or not the time during which the thermal head 12 is maintained in pressing engagement with the printing sheet 5 has exceeded a predetermined time. If the judgment is YES, the control unit 31 outputs, in step 44, a head release signal to the solenoid drive circuit 34 to move the thermal head 12 away from the printing sheet 5. Then, in step 45, it is judged whether printing data, including character data and space data, and printer drive command signals, such as a sheet advancing signal, a tab signal, a carriage return signal and a back space signal, have been inputted. If the judgment is NO, the operation shifts to step 41. If the judgments passed in steps 41 and 43 are NO, the operation shifts to step 45. If the judgment passed in step 45 is YES, then the control unit 31 judges, in step 46, whether the inputted signal refers to printing data, such as character data or space data. If the judgment is YES, it is judged, in step 47, whether the inputted printing data are space data. If the judgment is NO, it is judged in step 48 by the control unit 31 whether the thermal head 12 is held in pressing engagement with the printing sheet 5. If the judgment is NO, the control unit 31 outputs a head pressing signal to the solenoid drive circuit 34 in step 49, to bring the thermal head 12 into pressing engagement with the printing sheet 5. Then, in step 50, the control unit 31 resets the counter for counting the time during which the thermal head 12 is held in pressing engagement with the printing sheet 5. Thereafter, the control unit 31 causes, in step 51, the printer 1 to perform a printing operation based on the inputted character data, before the operation shifts to step 41. If the judgment passed in step 47 is YES, the operation shifts to step 51; if the judgment passed in step 48 is YES, the operation shifts to step 50.

Meanwhile, when the judgment passed in step 46 is NO, the control unit 31 judges, in step 52, whether the thermal head 12 is held in pressing engagement with the printing sheet 5. If the judgment is YES, then the control unit 31 outputs, in step 53, a head release signal to the solenoid drive circuit 34 to move the thermal head 12 away from the printing sheet 5. Then, in step 54, the control unit 31 causes the printer 1 to perform a predetermined operation depending on whether the inputted signal is a sheet advancing signal, a carriage returning signal, a tab signal or a back space signal. Thereafter, the operation shifts to step 41. If the judgment passed in step 52 is NO, the operation shifts to step 54.

From the foregoing description, it will be appreciated that in the printer 1 using the thermal transfer-ribbon according to the invention, the thermal head 12 is held in an inoperative position in which it is released from pressing engagement with the printing sheet lapse of a predetermined time following completion of a printing operation or interruption thereof, so that it is possible to set or remove the printing sheet 5 or replace the thermal transfer-printing ribbon 27 without requiring a manual operation of a head release lever. This is conducive to improved operability of the printer 1.

What is claimed is:

1. A thermal printer comprising:

first holding means for normally holding a thermal head having a multiplicity of heat generating elements in an inoperative position in which the thermal head is away from a printing sheet while no printing is required;

second holding means for holding the thermal head in an opertive position when print data are printed in which the thermal head presses against the printing sheet through a thermal transfer-printing ribbon and the heat generating elements are selectively caused to produce heat to melt a coat of thermomelt ink applied to the thermal transfer-printing ribbon to print predetermined characters on the printing sheet;

actuating means for moving the thermal head between the inoperative position in which the thermal head is released from pressing engagement with the printing sheet and the operative position in which the thermal head is held in pressing engagement with the printing sheet;

counting means for counting time after a printing operation of inputted print data is completed by the thermal head in the operative position until next print data is inputted; and control means for causing the actuating means to move the thermal head from the operative position to the inoperative position when the contents of the counting means reaches a predetermined value.

2. A thermal printer as claimed in claim 1, in which said printing head is held in an interrupted position and said counter means is set for a counting operation when printing data is interrupted during a line printing operation, said counter means being reset when printing data is resumed; and said control means moves the thermal head from the operative position to the inoperative position in the interrupted position when the content of the counter reach said predetermined value without moving the thermal head in the printing direction.

3. A thermal printer as claimed in claims 1 and 2, in which said actuating means is a solenoid mounting on a frame and connecting by plunger to one end of a head release means, so that the thermal head is actuated between the inoperative position and the operative position.

4. A thermal printer as claimed in claim 3, in which said second holder means is a permanent magnet mounted within the solenoid.

* * * * *